C. F. WASSERFALLEN.
SPARE RIM HOLDER.
APPLICATION FILED OCT. 29, 1917.
1,357,431.
Patented Nov. 2, 1920.
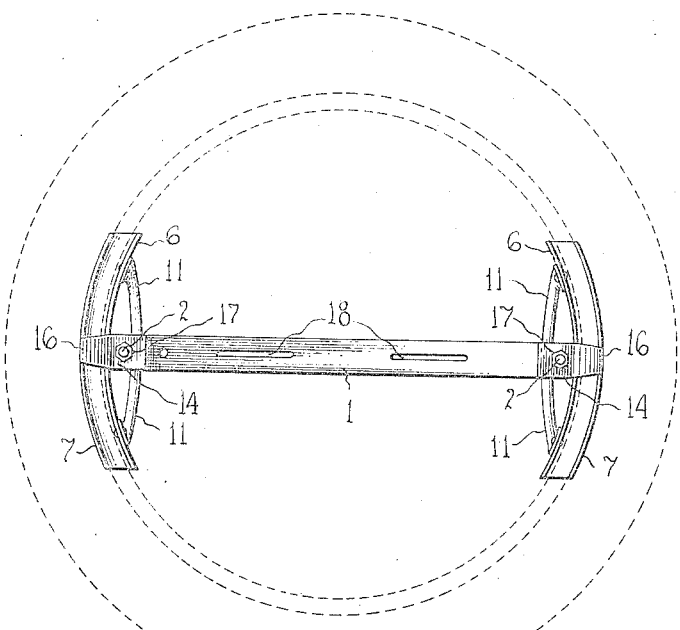
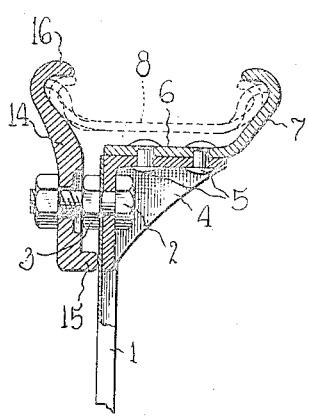
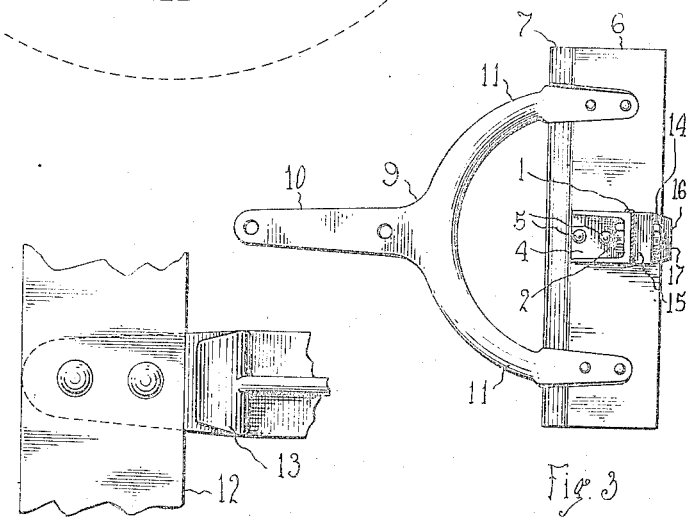
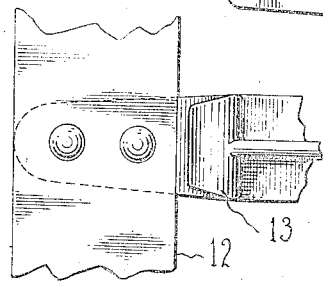
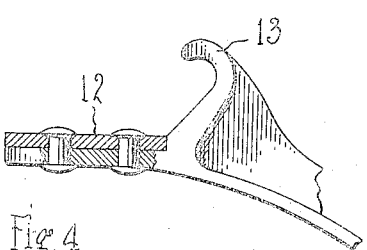
Witnesses
Arthur F. Draper
Chas. W. Stauffer
Inventor
Charles F. Wasserfallen
By Barthel & Barthel
Attorneys

UNITED STATES PATENT OFFICE.

CHARLES F. WASSERFALLEN, OF DETROIT, MICHIGAN, ASSIGNOR TO DETROIT TIRE CARRIER CO., OF DETROIT, MICHIGAN, A CORPORATION OF MICHIGAN.

SPARE-RIM HOLDER.

1,357,431.

Specification of Letters Patent.   Patented Nov. 2, 1920.

Application filed October 29, 1917. Serial No. 199,152.

*To all whom it may concern:*

Be it known that I, CHARLES F. WASSERFALLEN, a citizen of the United States of America, residing at Detroit, in the county of Wayne and State of Michigan, have invented certain new and useful Improvements in Spare-Rim Holders, of which the following is a specification, reference being had therein to the accompanying drawings.

This invention relates to spare tire or tire rim supporting means and to an arrangement thereof whereby a tire rim is perfectly held and locked in position by a very light, efficient and attractive device which does not add appreciably to the weight of the machine, and can be utilized also for carrying a license tag, plate, tail-light or the like.

The invention consists in the matters hereinafter set forth, and more particularly pointed out in the appended claims.

In the drawings,

Figure 1 is a view in elevation of a tire carrier or rim holder that embodies features of the invention;

Fig. 2 is a view in section, partially broken away and enlarged, showing one form of holding clamp;

Fig. 3 is a view in detail of a supporting bracket of the device, and

Figs. 4 and 5 are views in detail of a slight modification of the device.

As herein shown in preferred form a bar 1 is connected at its ends by studs 2 and holding nuts 3 with bracket members 4 suitably ribbed and flanged to combine strength and lightness and riveted as at 5, or otherwise secured to segmental rim holding members 6. Each of the latter has an inner flange 7 which is adapted to hook over an applied spare rim that may be of any conventional type, as indicated by the dotted diagram 8.

A pair of supporting brackets 9 having shanks 10 that may be connected to a vehicle body, are each arranged with forked arms 11 which are secured to and support the segments 6. If desired, and as a modification, the flange 7 may be omitted from the member 6 and a plane strip such as indicated in Figs. 4 and 5, at 12 may be secured to the brackets which in this instance are provided with rim retaining lugs 13.

Each bracket 4 has a tire retaining clip 14 that is slotted to loosely engage the body of the stud 2 and to rock at the inner end on a lug 15 while the outer inturned portion 16 coöperates with the rim 7 of the lugs 13, acccording to the construction used, in retaining the applied rims indicated at 8. A suitable nut 17 of any preferred type engages the stud to force the clip home.

The strip 1 may likewise have longitudinal slots 18 through which the straps of a license tag or holding members thereof or of a tail-light, may be passed and secured.

One feature of the device that is thus constructed is its extreme rigidity and lightness while the design is such that it adds no unsightly features to a car. Because of the support afforded to the segments at their end portions by the bifurcated brackets, the applied rims and tires are held very securely while the extra weight and space taken by a continuous annular holder is avoided. Furthermore a padlock and chain may be applied around the tire and between the arms of the bracket and thereby prevent stealing of the spare rim and casing.

Obviously, changes in the details of construction may be made without departing from the spirit of my invention and I do not care to limit myself to any particular form or arrangement of parts.

What I claim is:—

1. Spare tire and tire rim supporting means comprising a pair of oppositely disposed angular bracket members connected by a cross bar and provided each with a segmental rim holding member secured thereto and with a clip fulcrumed on the bracket and coöperating with the rim holding member to secure an applied tire or rim, and supporting brackets for the rim holding member adapted to be mounted on a vehicle.

2. A spare tire and tire rim holder comprising a pair of oppositely disposed segmental rim-holding members each having a flange to engage one side of a rim or tire, a bar connecting said members and a rocking clip secured to said bar opposite to said members and coöperating therewith to hold a tire or rim.

3. Spare tire and tire rim supporting means comprising a pair of oppositely disposed angular members connected by a cross bar, a segmental rim holding member mounted on each bracket member, a clip fulcrumed on the bracket, a stud securing the clip to coöperate with the rim holding member to secure an applied tire or rim, and means for mounting the rim holding member and connected brackets on a vehicle.

4. Spare tire and tire rim supporting means comprising a pair of oppositely disposed bracket members connected by a cross bar provided each with a segmental rim holding member of some extent, a clip fulcrumed on each bracket and coöperating with the rim holding member to secure an applied tire or rim, and a supporting bracket for each rim holding member having a pair of arms secured to the opposite ends of the rim holding member and a shank adapted to be secured to a vehicle.

5. Spare tire and tire rim supporting means comprising a pair of oppositely disposed bracket members, a cross bar connecting the bracket members, a segmental rim holding member on each bracket member, a slotted clip, a stud on the bracket member engaging the clip, the clip and rim holding member coöperating to retain an applied tire or rim, and a bifurcated supporting bracket for each rim holder attached by the arms thereof to the ends of the rim holder and provided with a shank for mounting the supporting member on a vehicle.

In testimony whereof I affix my signature in the presence of two witnesses.

CHARLES F. WASSERFALLEN.

Witnesses:
 ANNA M. DORR,
 CHAS. W. STAUFFIGER.